United States Patent
Brockway et al.

(10) Patent No.: US 8,611,632 B2
(45) Date of Patent: Dec. 17, 2013

(54) METHOD OF SELECTING AND VISUALIZING FINDINGS WITHIN MEDICAL IMAGES

(75) Inventors: John Philip Brockway, Davidson, NC (US); William Benjamin Carruthers, III, Charlotte, NC (US)

(73) Assignee: 361° Systems, Inc., Davidson, NC (US)

( * ) Notice: Subject to any disclaimer, the term of this patent is extended or adjusted under 35 U.S.C. 154(b) by 1107 days.

(21) Appl. No.: 12/574,393

(22) Filed: Oct. 6, 2009

(65) Prior Publication Data

US 2010/0021031 A1 Jan. 28, 2010

Related U.S. Application Data

(63) Continuation-in-part of application No. 11/191,768, filed on Jul. 28, 2005, now Pat. No. 7,599,542.

(60) Provisional application No. 60/669,432, filed on Apr. 8, 2005.

(51) Int. Cl.
*G06K 9/00* (2006.01)

(52) U.S. Cl.
USPC .......................................................... 382/132

(58) Field of Classification Search
USPC ................... 382/128, 132–133; 600/424–427
See application file for complete search history.

(56) References Cited

U.S. PATENT DOCUMENTS

| | | | |
|---|---|---|---|
| 5,003,979 A | 4/1991 | Merickel et al. | |
| 5,235,510 A | 8/1993 | Yamada et al. | |
| 5,273,040 A | 12/1993 | Apicella et al. | |
| 6,112,112 A | 8/2000 | Gilhuijs et al. | |
| 6,430,430 B1 | 8/2002 | Gosche | |
| 6,438,403 B1 | 8/2002 | Cline et al. | |
| 6,553,327 B2 | 4/2003 | Degani | |
| 6,591,004 B1 | 7/2003 | VanEssen et al. | |
| 6,611,778 B2 | 8/2003 | Degani | |
| 7,088,850 B2 * | 8/2006 | Wei et al. | 382/128 |
| 7,245,748 B2 | 7/2007 | Degani et al. | |
| 7,317,821 B2 | 1/2008 | Chen et al. | |
| 2002/0082495 A1 | 6/2002 | Biswal et al. | |
| 2004/0081340 A1 | 4/2004 | Hashimoto | |
| 2004/0184644 A1 | 9/2004 | Leichter et al. | |
| 2005/0010097 A1 | 1/2005 | Cline | |

(Continued)

OTHER PUBLICATIONS

Subramaian Kalpathi R; Brockway John P; Carruthers William B, "Interactive detection and visualization of breast lesions from dynamic contract enhanced MRI volumes" computerized medical imaging and graphics—the official journal of the Computerized Medical Imaging Society (United States) Dec. 2004, 28, (8), p. 435-444.

(Continued)

*Primary Examiner* — Duy M Dang
(74) *Attorney, Agent, or Firm* — Brian J. Colandreo; Michael T. Abramson; Holland & Knight LLP

(57) ABSTRACT

A method of processing regions of interest (ROI) obtained using computed-aided detection (CAD) along with reference image data to assist in evaluation of disease within an anatomical volume. After obtaining ROIs and reference image data, additional information related to each ROI is automatically computed. Subsets of ROIs are selected for use in visualization. ROIs are then presented to an observer in interactive, linked views, each view presenting optimally certain aspects of the ROIs and mapping ROI inclusion within the subsets to visual parameters.

20 Claims, 9 Drawing Sheets

(56) References Cited

U.S. PATENT DOCUMENTS

| | | |
|---|---|---|
| 2005/0027188 A1 | 2/2005 | Metaxas et al. |
| 2005/0096530 A1 | 5/2005 | Daw et al. |
| 2005/0113651 A1 | 5/2005 | Wood et al. |
| 2007/0036402 A1 | 2/2007 | Cahill et al. |
| 2007/0165920 A1 | 7/2007 | Gering et al. |

OTHER PUBLICATIONS

Brockway John P; Subramaian Kalpathi R; Carruthers William B; Insko Erik K, "Detection and Visualization of Inflammatory Breast Lesions Using Dynamic Contrast Enhanced MRI Volumes", Memory Testing Corp. and Novant Health, Charlotte NC, Computer Science, University of North Carolina at Charlotte, NC, Mecklenburg Radiology and Novant Health, Charlotte, NC (2004), 2 pgs.

* cited by examiner

METHOD OF SELECTING AND VISUALIZING FINDINGS WITHIN MEDICAL IMAGES

CROSS REFERENCE TO RELATED APPLICATION

This application is a continuation-in-part of U.S. patent application Ser. No. 11/191,768 filed on 28 Jul. 2005, now issued as U.S. Pat. No. 7,599,542 on 6 Oct. 2009, which claims the benefit of U.S. Provisional Application No. 60/669,432 filed on 8 Apr. 2005.

TECHNICAL FIELD

The present invention generally relates to computer-aided detection (CAD) in medical imagery, and in particular, relates to a way of processing and selecting ROIs obtained from CAD and presenting the ROIs together with referenced image data in linked visualizations.

BACKGROUND

In medical imaging, computer-aided detection (CAD) can supplement radiology reading tasks by providing specialized tools to assist in detecting or diagnosing lesions that may otherwise be difficult to evaluate. CAD systems can offer high sensitivity and increasing specificity. Breast and prostate MRI exams routinely generate hundreds or thousands of images that radiologists must exhaustively search for patterns of malignancy. CAD can alleviate this time-consuming task and offer additional computational analysis of potential malignancies. While CAD can reduce the time required to interpret images and prepare reports, it can still produce unwieldy amounts of information for radiologists to assess. In addition, it can produce results with lower specificity than a radiologist due to algorithmic constraints or access to a limited scope of information. These factors necessitate improvement in CAD methods and in evaluating CAD findings.

A CAD system can represent such findings as a collection of regions of interest (ROI), each ROI defined as a boundary in space representing the extent of the ROI. ROIs may also comprise quantified information about the morphology, composition, or suspected diagnosis of the underlying finding.

CAD findings are typically determined from one or more image series of a single imaging modality corresponding to an anatomical volume, although advances have been made in multi-modality CAD and CAD incorporating detailed patient information. In addition to performing CAD using images from multiple sources, it may be desirable to visualize CAD results using one or more reference images, or to obtain information from the reference images about regions described by the CAD results.

For some applications of CAD, such as dynamic contrast-enhanced MRI (DCE-MRI) of the breast and prostate, radiologists analyze kinetic curves of intensity over time to identify patterns that may indicate malignancy. These curves represent the presence of a contrast agent with the biological tissue over time and can be described by their wash-in, the rate of enhancement to a maximum, and wash-out, the rate at which they decrease from the maximum. Curve enhancement can be visualized using subtraction images. Both wash-in and wash-out can be visualized using parametric maps. While many abnormalities exhibit enhancement, malignancies are usually distinguished to one knowledgeable in the art by high wash-in and measurable wash-out rates. This distinction highlights the importance of access to a rich set of kinetic information when interpreting images.

In addition to kinetic characteristics, radiologists also assess the morphology of lesions. Although kinetic curves can assist in discriminating among lesion types, sometimes they are ambiguous and then morphology is used as a subsequent determining factor. 3D visualization of lesions can allow radiologists to quickly evaluate morphology.

Radiologists can use CAD systems for assistance in compiling reports, but they may also need assistance in sifting through voluminous CAD findings before compiling a report. A CAD system can offer a semi-automated workflow, where the system enhances certain patterns of data while relying on the user to select a seed location to drive further analysis. Other workflows offer a more automated approach, where the system itself takes the step of seeding and enumerating suspicious findings. Both workflows can produce extensive information, and an efficient approach is needed to evaluate this information. In addition, other medical specialties could benefit from visualizations that aid in the performance of their profession.

Surgeons can use visualization tools to orient, locate, and estimate resection margins and volume of lesions. Interactive visualization of lesions embedded within the target tissue could reduce the numbers of surgeries, reduce the time necessary for surgery, increase the accuracy of surgical resection, and aid in treatment judgments made at the time of or during surgery, such as lumpectomy or mastectomy.

Pathologists can use visualization tools to aid in localizing abnormalities within tissue specimens which have been resected by surgeons. They may section a specimen such as a mastectomy into varying slice thicknesses depending on certain general parameters prior to subjecting this tissue for mounting into slides or histopathological analysis. Pathologists' judgment in determining which slices of a gross specimen to process for immunohistochemical analysis is dependent on many factors. A flexible spatial visualization of suspected abnormalities within the specimen could guide pathologists and increase efficiency, regularize the pathological slicing procedure from case to case, reduce the necessary number of slices examined, reduce the number of slides that are processed from each slice, and reduce the number of false negative results.

BRIEF SUMMARY OF THE PREFERRED EMBODIMENTS

In one aspect, embodiments of the present invention supplement ROIs obtained from a CAD process by merging ROIs and computing additional information about them using corresponding regions within referenced images.

In another aspect, embodiments of the present invention provide methods to select subsets of ROIs for querying and visualization of particular aspects of ROIs.

In yet another aspect, embodiments of the present invention simultaneously present the ROIs in one or more views to provide visualization of multiple aspects of each ROI.

In yet another aspect, embodiments of the present invention provide mechanisms to link views to assist in navigating among ROIs and in selecting subsets of ROIs on which to focus.

These and other aspects of the invention will become apparent from the following description. In the description, reference is made to the accompanying drawings that form a part hereof, and in which there is shown a preferred embodiment of the invention. Such embodiment does not necessarily

DETAILED DESCRIPTION OF THE PREFERRED EMBODIMENTS

Embodiments of the present invention provide a method for selecting and presenting ROIs in a visual form that expedites evaluation by radiologists and reduces uncertainty in location and extent of ROIs by both surgeons and pathologists. It obtains ROIs from a CAD process along with reference image data. It automatically computes additional information about the ROIs. It visually enumerates all ROIs that warrant attention to prevent an observer from omitting any in evaluation. It offers a computed estimate of the hierarchy of lesion importance. It offers views of the spatial characteristics of ROIs as well as their composition. It offers linking, brushing, and navigation among views.

Figure 1:
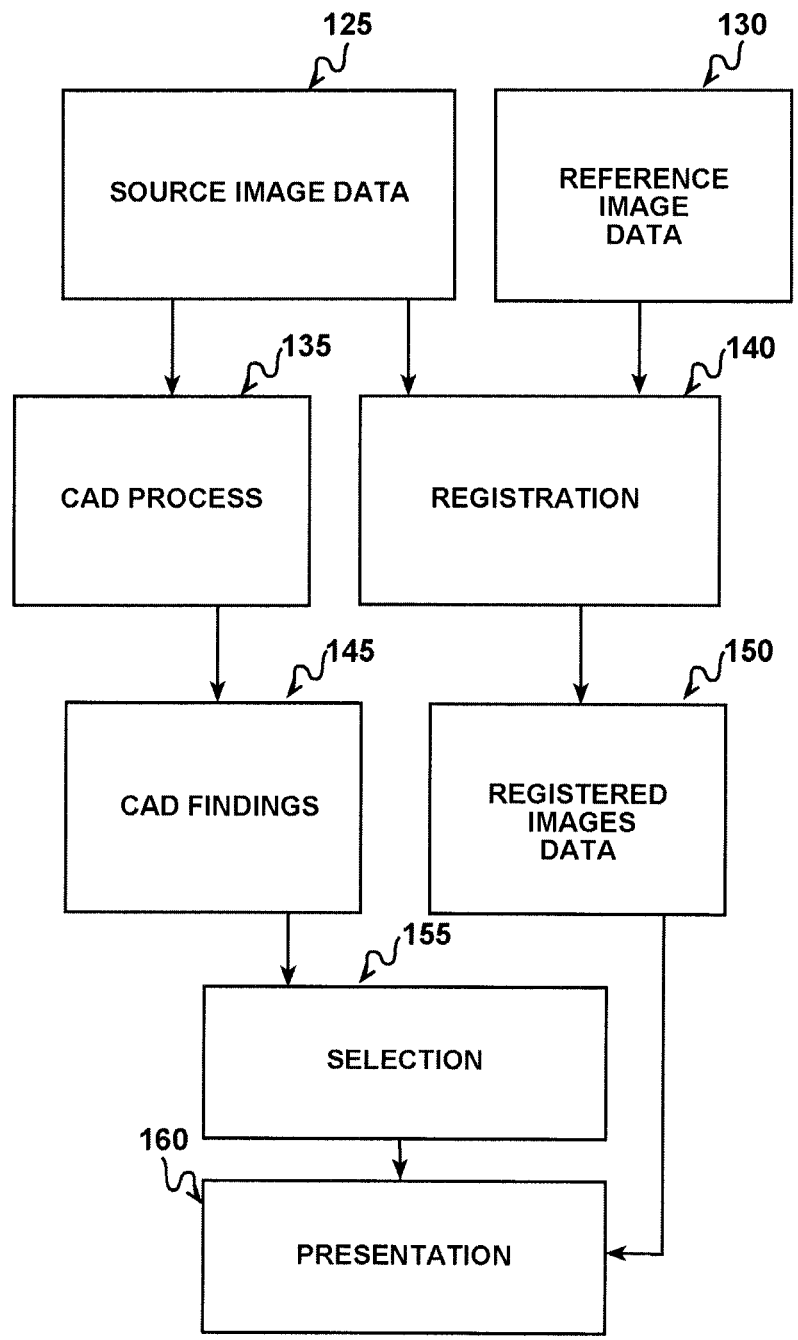
FIG. 1 is a block diagram of the data flow in detecting and presenting ROIs.

FIG. 1 is a block diagram of the data flow in detecting and presenting ROIs. The CAD process 135 may detect and analyze tissues or abnormalities using source image data 125 to produce CAD findings 145. Reference image data 130 is obtained for processing for later use in presentation 160. If reference image data 130 is different from the source image data 125, registration 140 must implement a method to determine and apply a transformation of the reference image data 130 into source image data 125 space to produce registered image data 150. Selection 155 is performed on CAD findings 145 to define subsets for use in presentation 160.

CAD findings 145 comprise ROIs, which are represented using a ROI map defining location-varying compositional information. The ROI map may comprise additional region descriptors corresponding to segmented anatomical structures within the ROI map, such as location, extent, or analysis results. Compositional information may include, for example, confidence scores representing probabilities of membership into particular types of tissues or abnormalities; probability of presence of disease; or parametric wash-in and wash-out characteristics. A ROI map may be represented as one or more images defined relative to the anatomical volume. Analysis results may include metrics describing a ROI and possibly a set of confidence scores representing the likelihood, for a set of categories, that the region belongs to a particular category. When information about individual regions is not available, a system may use the ROI map to segment individual ROIs.

Figure 2:
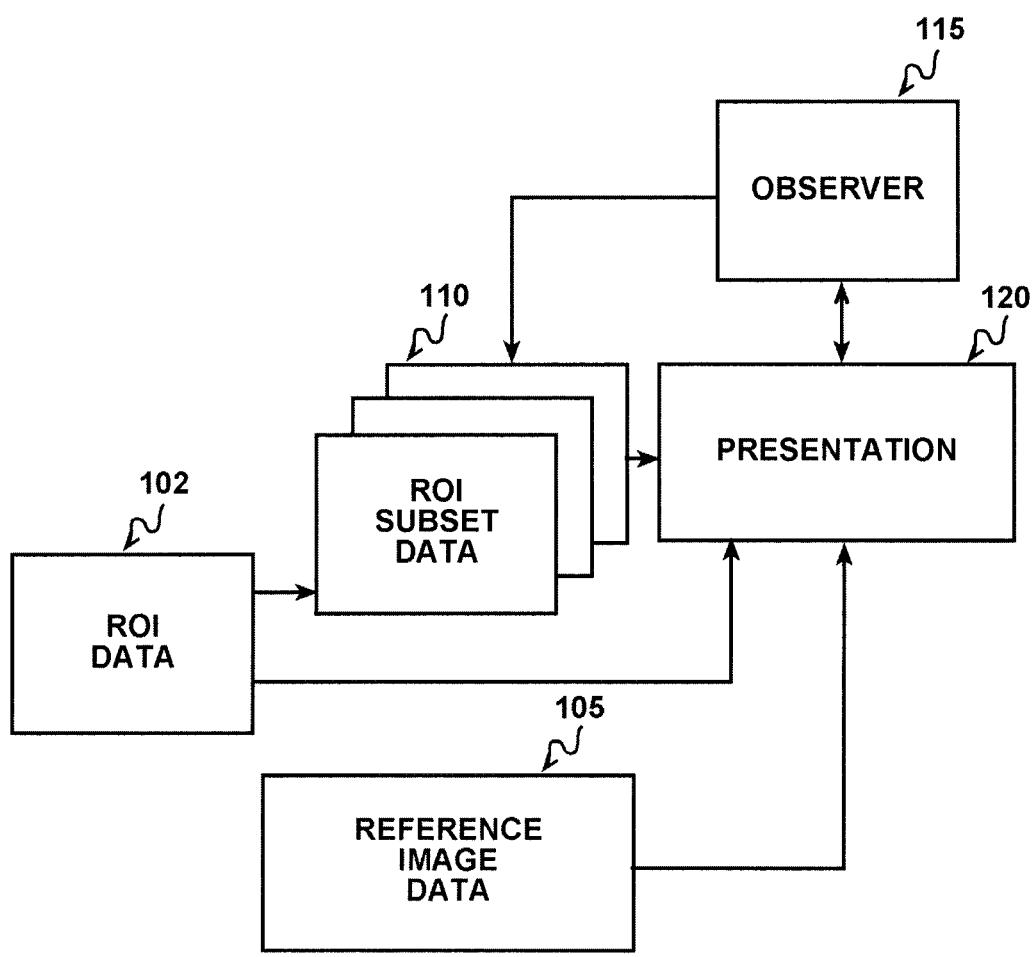
FIG. 2 is a block diagram of the interaction of an observer with ROI subset data and a presentation module.

FIG. 2 is a block diagram of the interaction of an observer 115 with ROI subset data 110 and presentation 120. ROI subset data 110 is derived from ROI data 102. It is presented to the observer 115 with reference image data 105 in presentation 120. The observer 115 evaluates the presentation 120 and may continue to refine ROI subset data 110.

After individual ROIs are obtained, they are merged together when they represent parts of the same anatomical process, such as multi-focal disease. This step reduces the number of ROIs for evaluation and aids in visualizing the extent of an anatomical process. Merging may be performed by clustering ROIs and aggregating any characteristics obtained from their region descriptors. Clustering could be performed by using, for example, a similarity metric based on compositional metrics such as signal-time curve similarity or spatial metrics such as location, extent, and morphology. Aggregating region descriptor confidence scores could be performed by computing weighted averages of individual lesion confidence scores, using ROI volume as a weight.

Figure 3:
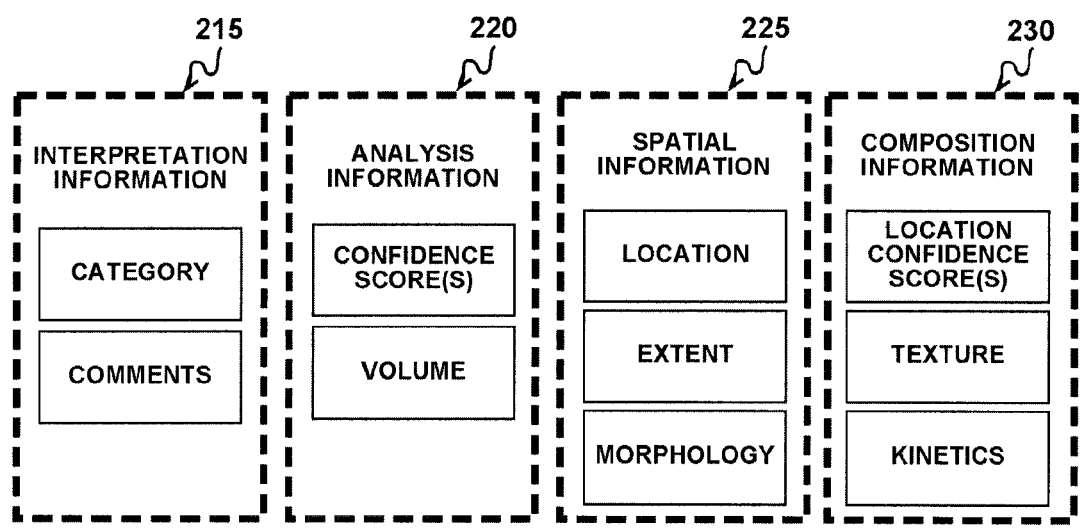
FIG. 3 is a block diagram of possible computed and interpreted information related to a ROI.

FIG. 3 is a block diagram of computed and interpreted information related to a ROI. It comprises interpretation information 215, analysis information 220, spatial information 225, and composition information 230. After merging ROIs, the system may compute analysis information 220, spatial information 225, and composition information 230 if it is not present. Some of this information, such as confidence scores, volume, extent, or other analysis results could be obtained from region descriptors if present, and in such a case computing this information is unnecessary. The observer 115 may assign interpretation information 215 to ROIs.

Composition information 230 comprises location-varying information within the ROI. For a particular location within the anatomical volume, it may comprise ROI map data at the location, kinetic curves obtained from reference images with a temporal dimension, and textural information describing the distribution of signal values within a neighborhood about the location in one or more reference images. The neighborhood may be defined as a set of points contained within a sphere, box, or other volume about a central point, possibly constrained to an image grid or within a minimum distance of each other according to any of many distance metrics.

Analysis information 220 comprises summarizing metrics determined by the CAD process if it provides region descriptors, such as confidence scores and metrics derived from the ROI data, such as ROI volume and an importance score. Overall confidence scores represent the likelihood that a ROI belongs to a particular classification. Volume may be computed as a sum of all included volume elements (voxels), possibly weighted by voxel confidence scores. Importance provides an indication to an observer of the relative priority that should be given to a ROI. It may be computed in a variety of ways, such as, for example: by computing a weighted average of confidence scores and volume; or by modulating specific confidence scores and the volume.

Spatial information 225 comprises relative location, extent, focal points, and morphological information. Relative location provides a way to locate the ROI within the anatomical volume, and may be represented as the coordinates in the anatomical volume of the origin in ROI space. Extent comprises spanning intervals in various directions, most commonly orthogonal directions aligned to the anatomical volume and possibly an oblique direction that maximizes the extent. Focal points are locations within a ROI that represent the locations of separate parts of the same anatomical process, as lesions are often heterogeneuous in nature. They may be computed in a variety of ways, such as: by finding for each disjoint region the location substantially within the interior of the ROI with the highest confidence score in a particular category; or by computing a mean location, possibly using a confidence score as a weight.

Interpretation information 215 comprises view inclusion, category, and annotations. View inclusion determines whether a lesion should appear completely visible in any visualizations of the ROIs. An observer may set a category to mark that a ROI has a known or suspected diagnosis. Category may correspond to an established standard appropriate to the particular imaging domain, such as the ACR BI-RADS coding scheme for breast imaging.

After additional information has been computed about the ROIs, an observer may select one or more subsets of the ROIs to assist in visualizing specific ROIs or specific kinds of ROIs according to their computed characteristics. The inclusion of a ROI within a set may be defined by a binary term or, in the case of a fuzzy set, by a degree of membership.

Figure 4:
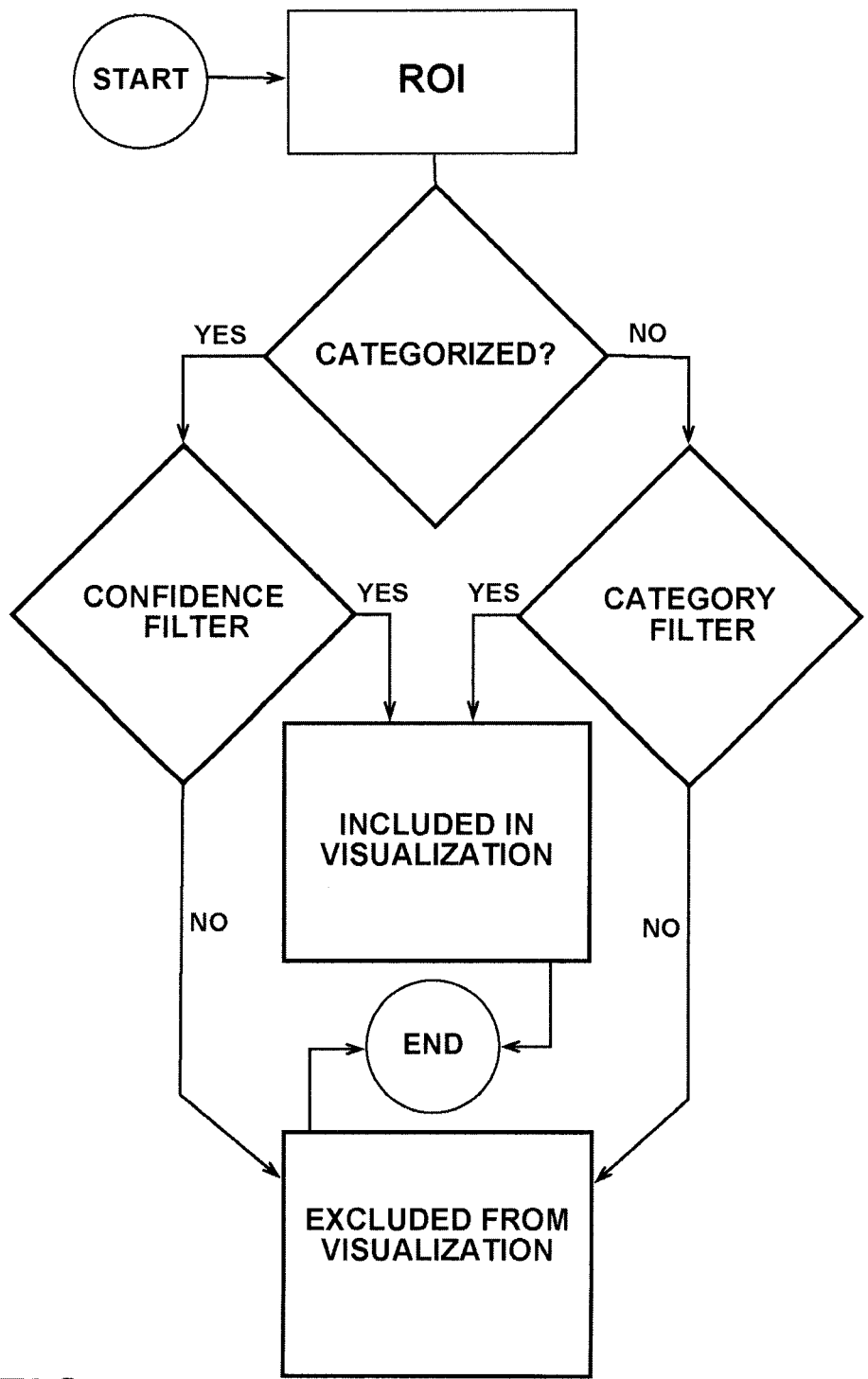
FIG. 4 is a block diagram of the shared selection data among presentation components.

In one example, an observer may set the view inclusion property of a ROI to select it as part of either an included or excluded subset, which could be used to modify its display within a visualization. To efficiently set view inclusion of multiple ROIs, an observer may apply a filter to the ROIs to include a subset that satisfy a certain condition. As illustrated in FIG. 4, one possible filter choice allows an observer to select minimum confidence levels for ROIs without a category specified and a minimum category for ROIs with a specified category. In cases with a large number of ROIs, many of which are false positives, this filter choice advantageously allows an observer to categorize only those few which are interpreted as positive and exclude all others.

In another example, a subset of ROIs with high confidence of malignancy may be selected and presented in a different hue than ROIs with lower confidence. Alternately, opacity, intensity, or other visual parameters could be used to distinguish ROIs within a particular subset. In the case of a fuzzy set, the degree of membership could advantageously be mapped to such visual parameters to represent it more clearly.

Figure 5:
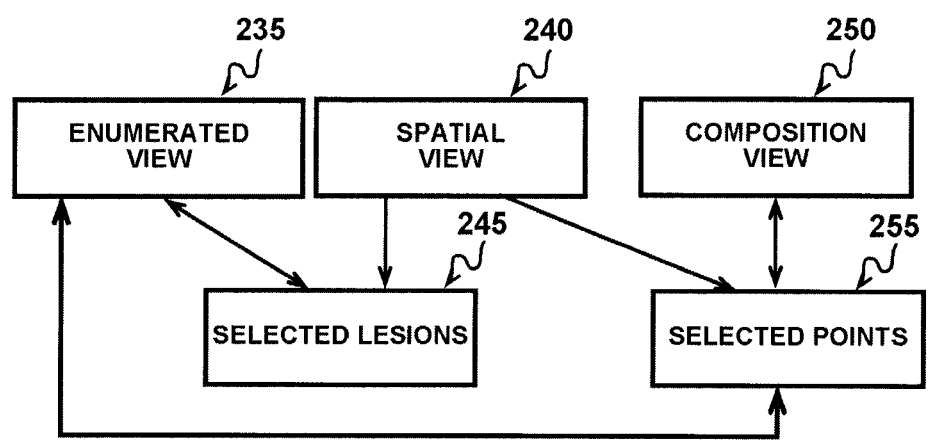
FIG. 5 illustrates a sample enumerated view.

The system provides multiple simultaneous views of a potentially voluminous set of ROIs to expedite evaluation. Views each prioritize the visualization of different aspects of ROIs. FIG. 5 is a block diagram of several possible views and their linkage to selection data, comprising an enumerated view 235, a spatial view 240, and a composition view 250. Views support linking by referencing shared selection data, comprising selected ROIs 245 and selected points 255. A ROI is selected if the selected ROIs contain it. A point is selected if the selected points contain it. Views support brushing by modifying the view inclusion of particular ROIs or by using ROI and point selections. Brushing refers to techniques facilitating selection of data for visualization. In this way, an observer might directly or indirectly specify which ROIs are displayed or omitted from a view. While these views are presented separately, one skilled in the art could redistribute their functions into a different configuration of views.

Figure 6:
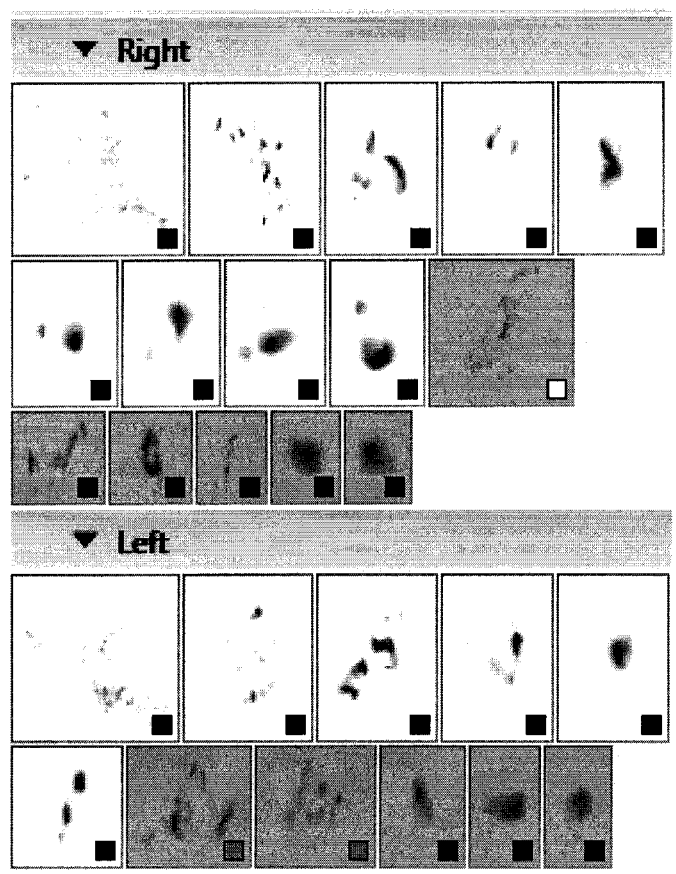
FIG. 6 illustrates a sample spatial view.

FIG. 6 illustrates the enumerated view 235, comprising a listing of ROIs, which presents all ROIs together in a space-efficient arrangement, possibly in a hierarchy of importance or location. The system may present individual ROIs within the listing in a variety of ways, such as a text or icon representations. The system may present an icon in a variety of ways. One such way by performing volume rendering on the underlying image data associated with the ROI to generate a projection of the ROI. Using a projection as an icon fosters quick and accurate recognition of the ROI. The system maps other information to visual cues, such as: mapping ROI importance to the relative size of an icon, saving display space and placing the greatest emphasis on ROIs that warrant the most investigation; mapping interpretation category to a color; and modifying color, positioning, or size of selected ROI icons. The system may order ROI based on information such as importance or location. While the enumerated view 235 effectively presents all ROIs together along with their status and importance, it does little to indicate their morphology, extent, and relative locations.

Figure 7:
FIG. 7 illustrates a sample use of multiple segments in a spatial view.

FIG. 7 illustrates the spatial view 240, comprising a 3D visualization of ROIs together with reference images. The system uses volume rendering to generate the visualization, offering a clear view of the morphology, extent, relative locations, and context of all ROIs. The system presents each ROI with a lighting model applied, the parameters of the lighting model determined by the status of the ROI and whether the ROI is selected. Other aspects of the appearance may be modified as well, such as texture. Modifying the appearance of selected ROIs facilitates linking among views. In one possible presentation scheme, ROIs may appear solid within one or more transparent reference images. In another presentation scheme, ROIs may appear transparently to better visualize their internal composition.

An observer may navigate throughout the anatomical volume in the spatial view by modifying a view transformation using standard pan, zoom, rotation, and other transformation controls, as well as by selecting ROIs and points. In one possible control scheme, an observer may select a ROI to locate the view transformation about the ROI. In another possible control scheme, an observer may select a point to locate the view transformation about the point. In yet another possible control scheme, an observer may direct a cursor to a visible ROI to select or navigate to it, possibly selecting a point of interest as well. The cursor may be specified by a gesture, mouse, stylus, or other input method. One possible way to select the point of interest is by computing the point at which a ray directed into the anatomical volume space from a point in view space intersects a ROI at some depth within the ROI, allowing inspection of an arbitrary point. Another choice is to advantageously constrain the cursor point to a nearby focal point within a ROI for a view space point over the ROI corresponding to the cursor point.

Figure 8:
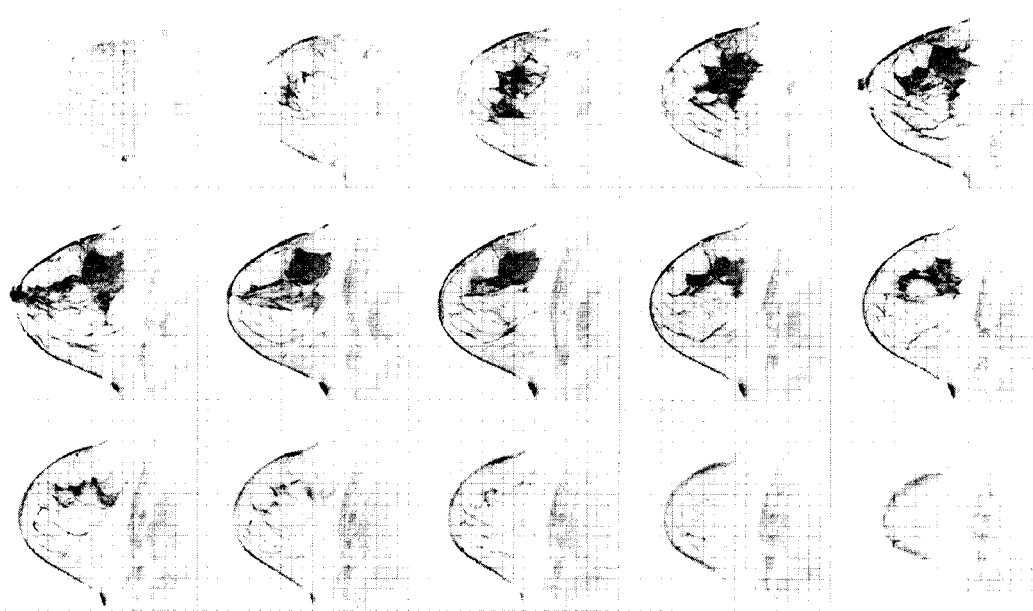
FIG. 8 illustrates a sample composition view.

To visualize a single subset of the anatomical volume in the spatial view 240, an observer may specify a clipped volume representing the subset. Specifying the clipped volume allows closer inspection of the interior of solid structures. In one possible representation, for simple clipping, the clipped volume comprises the intersection of half spaces, defined by the planes comprising near, far, left, right, superior, inferior, in FIG. 8, the system may present clipped segments simultaneously as a sequence. Modifying the quantity of clipped segments allows an observer to seamlessly control the subsets that the system presents in the spatial view 240.

Figure 9:
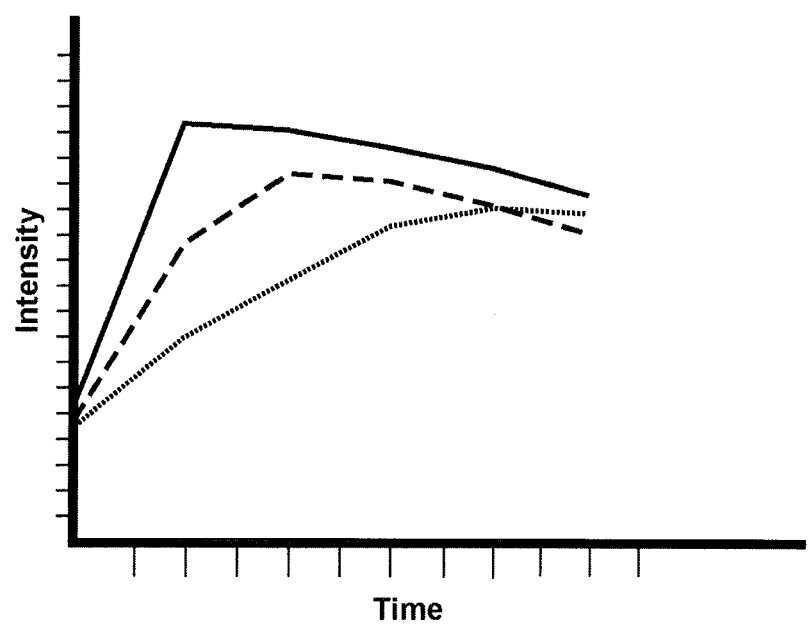
FIG. 9 is a flowchart of a possible ROI view visibility filter.

FIG. 9 illustrates the composition view 250, comprising information about specific points within a neighborhood in the anatomical volume. For DCE-MRI applications, this view may present: kinetic curves of interest in the neighborhood of the selected points 255 and allow navigation to these points; and representative kinetic curves for the selected ROIs. The composition anterior, posterior, or other oblique planes. In another possible representation, for more complex clipping, the clipped volume comprises a 3D image corresponding to the anatomical volume, where each voxel in the image is assigned a state of inclusion or exclusion from presentation.

To further visualize subsets of the clipped volume in the spatial view, an observer may specify a quantity of clipped segments, each clipped segment determined by the system as a portion of the clipped volume. In one possible implementation, the system could select a set of near and far clipping planes to define segments along a particular viewing direction. As illustrated view 250 may also present reference image intensity information in the neighborhood as one or more histograms.

What is claimed is:

1. A computer-implemented method for processing regions of interest (ROI) derived at least partially from image data corresponding to an anatomical volume, comprising:
   accessing, via one or more computers, ROIs;
   accessing, via at least one of the one or more computers, reference image data corresponding to the anatomical volume;
   generating, via at least one of the one or more computers, additional information related to the ROIs;
   selecting, via at least one of the one or more computers, one or more subsets of ROIs; and
   presenting, via at least one of the one or more computers, the ROIs with the additional information and the reference images to an observer, wherein the ROIs in the subsets are visually distinct.

2. The method of claim 1, further comprising selecting a set of points, each point corresponding to a location within the anatomical volume.

3. The method of claim 1, further comprising presenting the ROIs in a spatial view using volume rendering.

4. The method of claim 3, further comprising presenting each of the ROIs in the spatial view using a lighting model and determining lighting parameters of the ROI based on information related to the ROI and the inclusion of the ROI within the subsets of ROIs.

5. The method of claim 3, further comprising simultaneously presenting a plurality of volumes in the spatial view, each volume comprising a subset of the anatomical volume.

6. The method of claim 3, further comprising navigating the spatial view using the subset of ROIs.

7. The method of claim 2, further comprising modifying the set of points according to the focal points of ROIs within one or more of the subset of ROIs, each focal point being a representative location of part of an anatomical process.

8. The method of claim 2, further comprising presenting the selected points in a composition view.

9. The method of claim 8, further comprising presenting a plurality of signal-time curves in the composition view, each signal-time curve corresponding to a plurality of signal intensities over time at a location within a neighborhood of each of the selected points.

10. The method of claim 1, further comprising presenting the ROIs in an enumerated view.

11. The method of claim 10, further comprising presenting a plurality of ROI icons, each icon corresponding to a ROI.

12. The method of claim 11, wherein each ROI icon comprises a projection of image data corresponding to the ROI.

13. The method of claim 11, further comprising ordering the ROI icons based on information related to each corresponding ROI.

14. The method of claim 11, further comprising determining the size or color of each ROI icon based on information related to each corresponding ROI.

15. The method of claim 1, wherein the observer is a clinician screening for lesions within the anatomical volume.

16. The method of claim 1, further comprising merging ROIs according to compositional and morphological similarity and proximity.

17. The method of claim 1, further comprising computing a plurality of focal points related to each ROI, each focal point representing a substantially separate part of the same anatomical process.

18. The method of claim 17, wherein each of the focal points is a location substantially within the interior of a lesion with characteristics similar to those exhibited by a particular type of tissue or abnormality.

19. The method of claim 1, further comprising selecting one or more subsets of ROIs by applying one or more filters to the ROIs.

20. The method of claim 19, wherein the filters comprise a plurality of ROI thresholds using confidence levels or category levels.

* * * * *